Oct. 5, 1948. S. R. RICH 2,450,443
LIMITER
Filed June 5, 1944
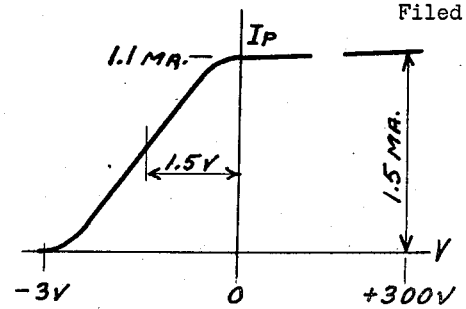
Fig.1
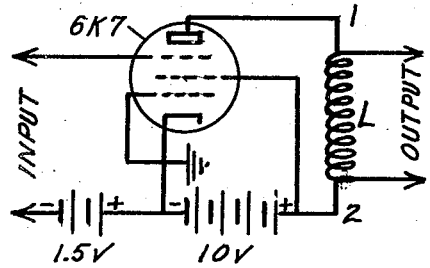
Fig.2
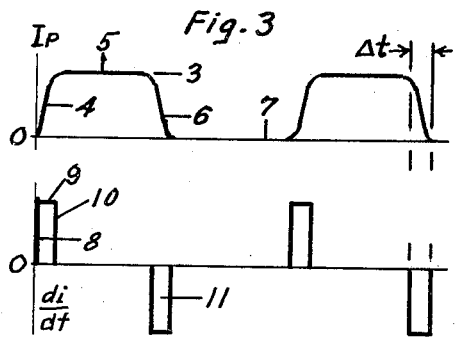
Fig.3
Fig.4
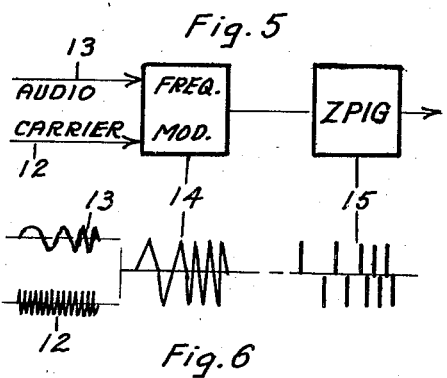
Fig.5
Fig.6
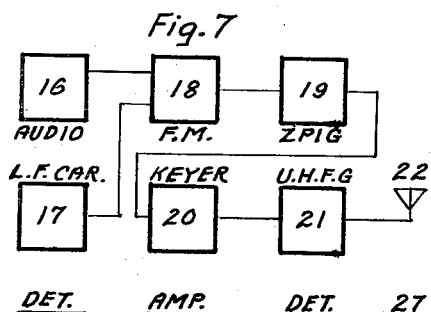
Fig.7
Fig.8
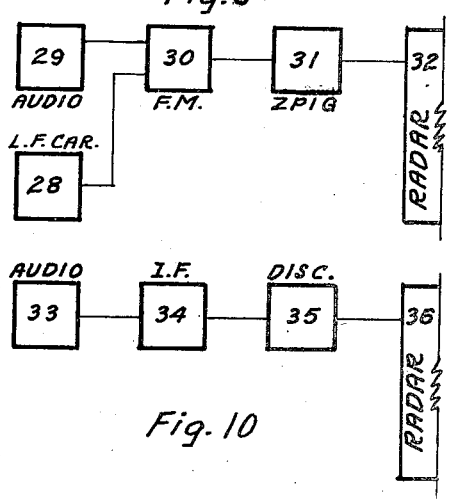
Fig.9
Fig.10
INVENTOR
STANLEY R. RICH
BY S. E. Bush
ATTORNEY Patented Oct. 5, 1948

2,450,443

UNITED STATES PATENT OFFICE 2,450,443

LIMITER

Stanley R. Rich, New York, N. Y.

Application June 5, 1944, Serial No. 538,801

5 Claims. (Cl. 178—44)

(Granted under the act of March 3, 1883, as amended April 30, 1928; 370 O. G. 757)

This invention relates to various devices of the electronic art such as limiters, square wave generators, pulse generators, modulators, ultra high frequency transmitters and receivers, and supplemental devices to convert standard radar apparatus for telephonic communication.

The term ultra high frequency is used here to denote the ultra high frequencies, beyond the range used in ordinary radio communication, and including those used in television and radar, such as for example from substantially 100 megacycles to several thousand megacycles. At such frequencies the behavior of apparatus can not be predicted as it can be in the ordinary radio communication range. For example, a modulator used for radio purposes will not work satisfactorily with an ultra high frequency transmitter.

An object of this invention is the development of a new method and apparatus for limiting current waves.

An object of this invention is the development of a new method and apparatus of generating square waves.

An object of this invention is the development of a new method and apparatus for generating pulses.

An object of this invention is the development of a new method and apparatus for modulation.

An object of this invention is the development of a new method and apparatus of transmitting radio waves.

An object of this invention is the development of a new method and apparatus of receiving radio waves.

An object of this invention is the development of a new method and apparatus for converting standard radar equipment to telephonic transmitting and receiving apparatus.

Figure 1 is the characteristic of the vacuum tube used in this invention.

Figure 2 is the circuit diagram of the impulse generator of this invention.

Figure 3 illustrates the limiting action and square wave generation of the vacuum tube of this invention.

Figure 4 illustrates the pulses appearing in the output circuit of the generator of Figure 2.

Figure 5 illustrates the modulator of this invention.

Figure 6 illustrates the wave form developed in the modulator of Figure 5.

Figure 7 is a block diagram of the transmitter of this invention.

Figure 8 is a block diagram of the receiver of this invention.

Figure 9 is a block diagram of the supplemental apparatus required for telephonic transmission over standard radar equipment.

Figure 10 is a block diagram of the supplemental apparatus required for the telephonic reception over standard radar equipment.

New characteristic curve

Part of this invention makes use of certain special characteristics of standard pentodes, such as a 6K7, discovered in experimentation, which when used as a radio frequency amplifier normally requires a plate voltage $Vp=250$ volts, a control grid supply of $Vc.q.=-3$ volts, and a screen grid supply of $Vsc.q.=125$ volts. Under these conditions the screen grid current is $Isc.q.=2.6$ milliamperes and the plate current is $Ip=10.5$ milliamperes.

This vacuum tube is connected as illustrated in Figure 2, that is, the control grid is tied to the cathode and grounded at $-B$, the screen grid connected to $+B$, and a bias of $-1.5$ volts connected in series with the input and suppressor grid. For the purposes of this discussion a milliammeter is connected between the plate and $+B$, in the place of induction coil L shown in Figure 2. And a B voltage of 10 volts is applied between the cathode and plate, and cathode and screen grid.

It was found that the tube was biased to cut off when a $-3$ volt was impressed on the suppressor grid or in other words the plate current $Ip=0$. If the negative bias is reduced the plate current rises proportionally, except for the slightly rounded sections of the characteristic at the heel and toe of the curve, see Figure 1, to a value where $Ip=1.1$ milliamperes, when the bias is zero volts. A continued application of the bias to $+300$ volts causes the plate current to rise to a value where $Ip=1.5$ milliamperes. For all practical purposes the plate current is substantially constant when the bias swings positive.

The discovery of this characteristic which may be said to be the control action of the suppressor grid in the presence of low anode and screen grid voltages is the basis of this invention when applied to the following apparatus. In each instance the application results in a new and useful device which functions in its own manner to produce its result, and those instances where it is applied to devices using ultra high frequencies it enables results to be accomplished that have never been accomplished before.

The limiter

Consider the circuit of Figure 2 with the inductance L removed and any suitable non-inductive load substituted therefor. In terms of transconductance between −3 and 0 suppressor grid volts, it is 370 micromhos; and between 0 and +300 suppressor grid volts, it is 1.3 michromhos. Obviously, any large signal applied to the suppressor grid of the tube would be automatically leveled off at ±1.5 signal volts. Such limiting properties of the suppressor plate transfer renders the above circuit a valuable limiter, which has special application in the reception of phase or frequency modulation, hereinafter termed frequency modulation in this disclosure.

The frequency modulated wave when received varies in amplitude due to many causes, chief of which is the noise level. When the frequency modulated wave is applied to a network to convert the frequency modulation to amplitude modulation the amplitude of the incoming frequency modulated wave must be constant in order to maintain the proportionality between frequency and amplitude. Hence the wave is passed through the above limiter circuit which levels off the peaks of the waves below a given minimum value such as illustrated at 3 in Figure 3.

The basic circuit may be modified by using an input transformer with a split secondary to accomplish the same result as set forth for the circuit of Figure 2. When this type of circuit is desirable, the two outside leads of the split secondary of the transformer are connected to the plate and the suppressor grid, and the tap lead is connected to the cathode to which the control grid is shorted. The connection of the secondary of the input transformer to the plate has a variable capacity condenser connected in series therewith for purposes of grid neutralization. The neutralization of the grid is required in order to prevent the coupling of signal voltage through the inter-element capacity. The inter-element capacity at ordinary radio frequencies may present no particular problem in the operation of the circuit, but at the ultra high frequencies this capacity becomes material and it must be taken into consideration in the design of the circuit, in order that the circuit may function in the manner intended.

This limiter has an important feature not possessed by other devices of this nature, and that feature is the fact that this limiter has substantially zero time constant. There are no resistance-capacity networks in the signal input circuit to affect the limiting action, which in certain instances is a distinct advantage over the common grid type limiter. In fact a substantially zero time constant is required for use in ultra high frequency work, and this is the main reason why this particular device must be used as the basis of the pulse generator, which will be shown to be commonly used in ultra high frequency apparatus to accomplish the desired results.

*The square wave generator*

Square wave generators are in common use today in ordinary radio work; however, these generators do not have a substantially zero time constant and consequently, are not suitable for ultra high frequency work. It will be noted that the limiter circuit discussed above produces a square wave as shown in Figure 3. It so happens, since up to +300 volts signal input may be used on this device, that the above circuit makes an excellent square wave generator particularly suited to ultra high frequency work. Commercially, the basic circuit (limiter circuit) is combined with an amplifier and suitable controls, and placed on the market as a square wave generator.

*Zero point impulse generator*

Since the characteristic of the tube is linear between −2.8 volts and −0.2 volt, the rate of change of current is substantially constant and the differential curve $$\frac{di}{dt}$$

will be flat topped and rectangular in outline. The plate current may be differentiated to obtain the differential voltage by making the plate load predominately inductive as illustrated in Figure 2. The differential voltage which is composed of rectangular pulses of short duration may be taken from the output terminals across inductance L.

In operation, the incoming signal is applied to the suppressor grid through the input terminals of Figure 2. For the purposes of this discussion the incoming signals may be assumed to be sine waves. The slope of the sine wave is a maximum where its intensity is zero, hence its rate of change is a maximum at zero, and the current in the plate circuit will rise rapidly to a value corresponding to +3.0 volts on the suppressor grid as illustrated at 4 in Figure 3. The plate current then levels off and remains constant as at 5 until the incoming signal is about to pass through the next zero point, at which time the plate current rapidly falls to zero as illustrated at 6. For the negative part of the incoming signal the plate current is zero as at 7. This illustrates one complete cycle and here on the cycle repeats itself. Up to this point of the discussion, we have limiting action and square wave generation.

Now let the square wave of current pass through inductance L in the plate circuit of Figure 2. At zero current the rate of change is a maximum and the magnetic field set up in coil L swings out instantaneously cutting the coil and inducing a voltage shown at 8 in Figure 4. The slope is zero for a constant rate of change as shown by the straight line portion of the characteristic curve, hence the impulse of Figure 4 will have a flat top 9. The rate of change must return to zero when the current reaches the steady state shown at 5 in Figure 3: it does so instantaneously as the magnetic field threading the inductance L collapses inducing a negative voltage shown at 10 in Figure 4. The pulse width is the width of the rate of change of current which for a square wave is practically instantaneous. The pulse is repeated in the negative direction for the decrease in current 6 of Figure 3 as illustrated at 11 in Figure 4.

It is obvious that this impulse begins at point of zero current for each cycle. Its duration is governed by the squareness of the current wave, which may be controlled by varying the input voltage value to the circuit of Figure 2. Thus, this impulse may be made very small in duration and as accurate as the zero point of the input wave. Since a large part of this invention develops around the functioning of this pulse generator, for purposes of identification and brevity, it will be given the name Zero Point Impulse Generator and abbreviated ZPIG.

Let's further consider the application of a sinusoidal voltage of 10,000 cycles and 300 peak volts to the zero point impulse generator. Figures 1 and 3 illustrate the transfer mechanism by means of which the square wave is generated. The change in plate current $i$ takes place in the time $\Delta t$, Figure 3; and the value of $\Delta t$ is given by solving the equation $1.5 = 300 \sin(2\pi.10^4/\Delta t)$. $\Delta t$ is found to be equal to $7.95 \times 10^{-8}$ seconds or somewhat less than 0.1 microsecond. Neglecting for the moment the time constant of the output circuit, the plate current changes in this very short time. This means that a change of 1.1 milliamperes takes place in $7.95 \times 10^{-8}$ seconds and $$\frac{di}{dt}$$

is equal to $1.38 \times 10^4$ amperes per second. If a plate load of only 2.5 millihenries is used a voltage of $$L\frac{di}{dt}$$

equal to 34.6 volts is generated in pulses of the above mentioned extremely short duration. The above calculations represents the actual design data for the zero point impulse generator, and they also clearly indicate that the device will function effectively in the ultra high frequency apparatus here set forth, because the power obtainable is ample and the time is small enough.

In actual practice, as is true of all electrical apparatus of this nature, the time constant of the circuit will lengthen the pulse duration and lower the peak voltage somewhat. The effects will be small since the plate resistance of the tube is of the order of one megohm, producing constant current characteristics and thus greatly reducing the time constant. This constant $L/R$ will be of the order of $2.5 \times 10^{-9}$ seconds which is negligibly small. In conclusion it can be said, since the rates of growth and decay of current are equal and are very small, the pulse output will be square in form and of the order of magnitude of 0.1 microsecond for the zero point impulse generator.

The pulse generator lends itself quite readily to nondistorting amplification by means of a direct coupled amplifier stage. In this circuit no reactive elements are added to the inductive plate pulse load save the inter-element capacities of the amplifier. These can be made or chosen small as desired and they have little effect on the pulse wave form.

In view of the properties of the zero point impulse generator it is superior to multivibrators or gaseous tube circuits of this type. It possesses the advantage of operation directly from a sine wave source of input, converting directly into square wave pulses. And the length of the pulse is directly controllable by adjusting either the magnitude of the input voltage or the plate and screen voltage of the zero point impulse generator. These properties make the device particularly applicable to radio-locator and television circuits.

The modulator

Zero Point Impulse Modulation, abbreviated ZPIM, is a means of transmitting in carrier impulses rather than in continuous amplitude or frequency modulation. As such, it is peculiarly adaptable to generators of ultra high frequencies, which can not be continuously modulated with any degree of success or stability. The general application of the principles of zero point impulse modulation as described will permit radio telephone communication on frequencies hitherto impracticable by previously known means.

By its nature zero point impulse modulation is adaptable to standard radar equipment, making it possible to use such installations for radio telephone communication in addition to their own function. Zero point impulse modulation units can be so connected that changeover from radar to radio-telephone, and vice versa, may be accomplished with a minimum of disturbance to the original set up and adjustments.

The basis of zero point impulse modulation is the premise that the zero voltage points of a frequency modulated carrier are the only necessary points for the extraction of intelligence. This is evident upon the examination of the function of the limiter in the common frequency modulation receiver circuits. That is, the limiter discards every portion of a frequency modulated wave but the zero cross over points. This is done by depressing or flattening the wave until, in the ideal case, only a trapezoidal form results, whose only similarity to the input wave is in the zero voltage points.

Obviously then, only the zero points are necessary to the faithful reproduction of frequency modulation. It follows, that the transmission of only the zero points of a low-frequency, frequency modulated wave is sufficient for the transmission of intelligence, and also that any repeated point such as the positive peak will suffice.

If a carrier of low frequency, say 45 kilocycles, such as illustrated at 12, in Figures 5 and 6, were frequency modulated by a given audio wave 13 (speech current) in frequency modulator 14, and a zero point impulse generator 15 develops an impulse for each zero point and a superfrequency transmitter were keyed briefly at each zero point of the low frequency carrier, the 45 kilocycle carrier can be extracted from the received impulses, the modulation detected and used for developing speech.

The advantages of such a modulating system include, first, a practical method of modulating common ultra high frequency generators. These generators which can not be successfully modulated by continuous means, yield to impulse modulation. A second advantage is the high duty cycle efficiency, comparable to those obtained in radio-locator circuits.

It is important to note here the use of the zero point of the frequency modulated wave as the necessary and sufficient condition for demodulation. The demodulation point can be shifted in phase in any direction without affecting its function. This is true as long as the same point is maintained in any given system (for example the ten or minus seven volt point). Thus the positive or negative voltage peaks may be substituted for the zero points with practical advantages in certain cases.

Another feature of the ZPIM is in its side band width. This is due to the short duration of pulse (less than 0.1 microsecond in general). Side band content of a zero point impulse modulated wave will include, in addition to the primary carrier frequency and its side bands and harmonics; frequencies out to some 10 megacycles depending upon the pulse characteristics.

To be of practical value in radio-telephone work, a transmitted wave must occupy at least one or two per cent of the spectrum at the frequency involved. For example, unless the band width of a 1,500 megacycle carrier is at least 15 megacycles, the practical tuning of receivers would be next to impossible. Amplitude or frequency modulated carriers occupy an extremely small portion of the spectrum at these frequencies and would consequently be extremely difficult to tune at the ultra high frequencies. From these considerations, it is clear that zero point impulse modulation is a solution to the problem of receiver tuning practicability at ultra high frequencies.

The transmitter

In Figure 7 the low frequency carrier is generated at 17 and fed into frequency modulator 18 along with audio currents 16 where the primary carrier is frequency modulated by the audio currents. The modulated carrier is fed to the zero point impulse generator 19 which develops an impulse of very short duration each time the modulated carrier passes through the zero point. These impulses operate a keyer 20 for keying the ultra high frequency generator 21 which transmits over antenna 22.

The final circuit is the ultra high frequency transmitter 21 and it may be any of the now common varieties of magnetron, Klystron or other oscillator forms. It is particularly noteworthy that the zero point impulse generator makes minimum demands on the design of the transmitter and it permits the same efficiency and economy found in radio locator circuits. The trend of the design problem in relation to frequencies, is that as the frequencies become higher the electrical design simplifies and the mechanical design becomes more complicated.

It should be noted that other electronic designs known to the art may be substituted for the pentode used in the zero point impulse generator 19 provided they have the same operational characteristics.

The receiver

The ultra high frequency receiver is illustrated in Figure 8 in block diagram form. The receiving antenna 27 passes the incoming impulses to detector 26 which is of the retarding field type. This type of detector is based upon the Barkhausen and Kurz oscillator which produces very high frequencies by moving a cloud of electrons back and forth between retarding fields. The detected impulses are amplified in aperiodic amplifier 25 which has a wide range, and operates into a fixed impulse counter detector 24 for low carrier frequency modulation. The output of the counter detector 24 feeds into the usual audio channel 23.

The tuning features of the ultra high frequency detector are quite simple, such as variable injected voltage tuning lines, and the features are not critical. In this instance zero point impulse modulation with its wide band width compensates for the tuning difficulties at super frequencies.

Other receiver designs may be substituted for the one outlined above using different circuits if they have the same operational characteristics.

Radiotelephone communication with radar equipment by the use of zero point impulse modulation The zero point impulse modulation system can be applied to any ultra high frequency generator. The conditions for the application is the presence of pulsing or keying circuits capable of producing pulses of approximately one microsecond. A secondary consideration is the character of the duty cycle of the generator system to be modulated.

The radar equipment that is already in use is adaptable to the above conditions. By using zero point impulse modulation units these existing facilities can be used for radio telephone communication.

The auxiliary zero impulse modulation units for radiotelephone communication consist of, for the transmitting end, a 10,000 cycle oscillator 28, Figure 9, producing a primary carrier which is frequency modulated at 30 by the audio input 29. The frequency modulated wave is fed into the zero point impulse generator 31, amplified, adjusted in length and then introduced into the radar pulsing circuits 32 in the place of the normal pulsing voltages.

The 10,000 cycle primary carrier was arbitrarily selected as a compromise between low distortion and low duty cycle. The primary carrier may also be generated by beat frequency means in which one oscillator is crystal controlled and the other modulated by reactance tube elements, thus combining modulation and low frequency generation in one circuit. This alternate means operates satisfactorily, but the preferred means is that illustrated in Figures 7 and 9. The power problem is solved by reducing the plate voltage on the ultra high frequency generator, and the reducing means is incorporated in the radar-radiotelephone switching equipment.

For the radar-radiotelephone receiving end, the auxiliary equipment is simple due to the presence of a good receiver in each radar installation. The impulses are received by the radar equipment 36 and fed to a 10,000 cycle discriminator 35, and from there to the intermediate frequency system 34, and on to the audio system 33. The receiving unit can be permanently connected to the radar equipment because unless another transmitting auxiliary unit is being used there can be no audible signal.

The invention described herein may be manufactured and used by or for the Government of the United States of America for governmental purposes without the payment of any royalties thereon or therefor.

I claim:

1. A method of operating a vacuum tube having a cathode, a plate, a control grid, a screen grid, and a suppressor grid; the control grid being shorted to the cathode and grounded, comprising the steps of applying to said suppressor grid a bias on the order of 1.5 volts negative, applying to said plate and screen grid a bias on the order of 10 volts positive, and impressing a fluctuating signal voltage between said cathode and said suppressor grid, whereby a substantially constant plate current is obtained for all values of positive voltage on said suppressor grid.

2. A method of operating a vacuum tube having a cathode, a plate, a control grid, a screen grid, and a suppressor grid; the control grid being shorted to the cathode and grounded, comprising the steps of applying to said suppressor grid a very small negative bias, applying to said plate and screen grid a positive bias on the order of one-tenth the rated normal plate bias, and applying a signal voltage between said suppressor grid and said cathode as input electrodes, whereby a substantially constant plate current is obtained for all values of positive voltage on said suppressor grid.

3. A method of operating a vacuum tube having a cathode, a plate, a control grid, a screen grid, and a suppressor grid; the control grid being shorted to the cathode and grounded, comprising the steps of applying to said suppressor grid a very low negative bias, applying to the plate and to the screen grid a positive bias having an absolute value on the order of six times the absolute value of said negative bias, and applying a signal voltage between said suppressor grid and said cathode as input electrodes, whereby a substantially constant plate current is obtained for all values of positive voltage on said suppressor grid.

4. A method of generating radio impulses by means of a pentode vacuum tube having the usual elements, comprising the steps of applying to the suppressor grid of said tube a small negative bias, applying to the plate and to the screen grid a low positive bias, grounding the number one grid and cathode, and applying to the suppressor grid a fluctuating signal voltage that swings the suppressor grid alternately positive and negative the plate current being substantially constant while said suppressor grid is positive, and deriving a voltage from said plate current while it is changing in value.

5. A method of limiting the intensity of a current wave by means of a pentode vacuum tube having the usual elements, comprising the steps of applying to the suppressor grid of said tube a small negative bias, applying to the plate and to the screen grid a low positive bias, grounding the number one grid and cathode, and applying to the suppressor grid a fluctuating signal voltage that swings the suppressor grid alternately positive and negative the plate current being substantially constant while said suppressor grid is positive.

STANLEY R. RICH.

REFERENCES CITED

The following references are of record in the file of this patent:

UNITED STATES PATENTS

| Number | Name | Date |
| --- | --- | --- |
| 1,933,219 | Nakajima | Oct. 31, 1933 |
| 2,230,243 | Haffcke | Feb. 4, 1941 |

FOREIGN PATENTS

| Number | Country | Date |
| --- | --- | --- |
| 118,392 | Australia | Apr. 27, 1944 |
| 118,054 | Australia | Feb. 3, 1944 |